May 7, 1957 T. L. BONKOWSKI 2,791,300
INTERLOCKING DEMOUNTABLE BRAKE LINING
Filed Nov. 15, 1954

INVENTOR.
TEOFIL L. BONKOWSKI
BY Lyon & Lyon
ATTORNEY

United States Patent Office 2,791,300
Patented May 7, 1957

2,791,300

INTERLOCKING DEMOUNTABLE BRAKE LINING

Teofil L. Bonkowski, Los Angeles, Calif.

Application November 15, 1954, Serial No. 468,792

5 Claims. (Cl. 188—234)

My invention relates to interlocking demountable brake linings, and included in the objects of my invention are:

First, to provide an interlocking demountable brake lining and brake shoe wherein the brake lining is provided with a backing plate having a plurality of foldable tabs along opposite margins and the brake shoe is provided with a plurality of means along corresponding margins for interlocking with said tabs when folded, whereby said backing plate and lining are secured against movement in any direction relative to said brake shoe.

Second, to provide an interlocking demountable brake lining which is particularly suitable as original equipment on vehicles, inasmuch as the brake lining may be presecured to a backing plate and the backing plate quickly secured to the brake shoe, and which permits use of automatic or semiautomatic machinery for this purpose.

Third, to provide an interlocking demountable brake lining which, although particularly suitable for original installations, may be readily and quickly replaced in the field when the lining has worn out in service.

With the above and other objects in view, as may appear hereinafter, reference is directed to the accompanying drawings in which.

Figure 1:
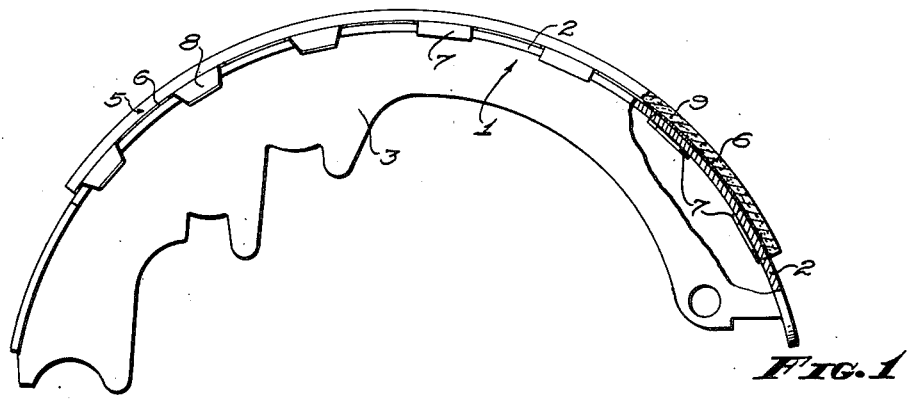
Figure 1 is a side view of a brake shoe and demountable brake lining incorporating my invention with a portion shown in cross-section to facilitate the illustration.
Figure 2:
Fig. 2 is a developed view of the brake shoe, showing the interlocking recesses on opposite sides thereof.

My interlocking demountable brake lining is adapted to be mounted on a special brake shoe 1. The brake shoe comprises an arcuate plate 2 having a radially inwardly directed flange 3, suitably profiled for attachment to the other elements of a brake assembly, not shown. The special brake shoe differs from the conventional brake shoe in that the side margins of the arcuate plate 2 are provided with a series of shallow recesses 4.

My demountable brake lining includes a brake lining unit 5 which comprises a backing plate 6 formed of relatively thin sheet metal and provided with tabs 7 along one margin and tabs 8 along the opposite margin. The backing plate is adapted to be bent arcuately so as to conform to the arcuate plate 2 of the brake shoe. An arcuate brake lining 9 is cemented to the backing plate 6.

Figure 3:
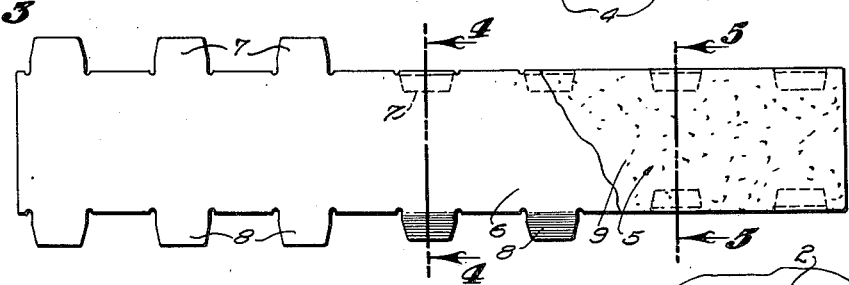
Fig. 3 is a similar developed view of the brake lining unit with a portion of the lining removed and with the interlocking tabs shown in various positions.
Figure 4:
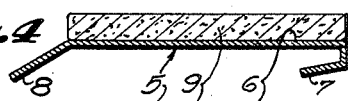
Fig. 4 is a transverse sectional view through 4—4 of Fig. 3.
Figure 5:
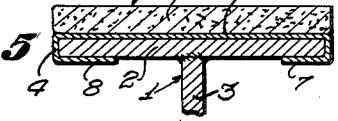
Fig. 5 is a transverse sectional view through 5—5 of Fig. 3, showing the brake shoe fragmentarily.

The tabs 7 and 8 may be identical and initially occupy a flat position such as shown in the left-hand portion of Fig. 3. However, it is preferred to partially preform these tabs. More specifically the tabs 7 are bent under the backing plate to form hook elements, as shown best in Fig. 5. The other tabs 8 are bent angularly, also as shown in Fig. 4. The tabs are so preformed for the purpose of facilitating attachment of the backing plate to the shoe, as it is merely necessary to hook the tabs 7 over one margin of the shoe, then bend the other tabs 8 under the shoe as shown in Fig. 5.

It will be observed that by forming the tabs 7 into hook elements and angularly bending the tabs 8, the backing plate may be readily and quickly slipped axially over the brake shoe, and that the tabs may be quickly brought into registry with the recesses 4 of the brake shoe. This can readily be done without the use of a jig or fixture to guide the backing plate into proper position.

Figure 6:
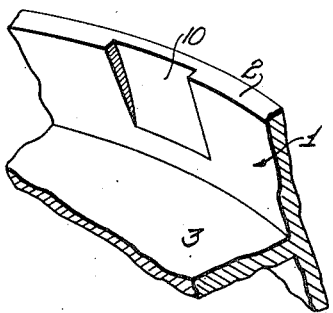
Fig. 6 is a fragmentary perspective view of a modified form of brake shoe wherein interlocking depressions are formed in the under sides thereof.

In place of or supplementing the side recesses 4, the arcuate plate 2 of the brake shoe may be provided with depressions 10 in its under surface, as shown best in Fig. 6. In such case the extended portions of the tabs 7 and 8 are pressed into these depressions.

Figure 7:
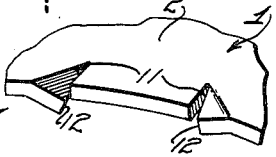
Fig. 7 is another fragmentary perspective view of my brake shoe, showing interlocking shoulders formed by depressing portions of the margins of the brake shoe.

Further, in place of the recesses 4, the arcuate plate 2 of the brake shoe may be provided with pairs of short axially directed slits 11 and the margins adjacent said slits may be bent downwardly to form depressed shoulders 12, as shown in Fig. 7. With this arrangement the tabs 7 and 8 are folded so as to lie between the pairs of shoulders and secure the brake lining against circumferential displacement.

Figure 8:
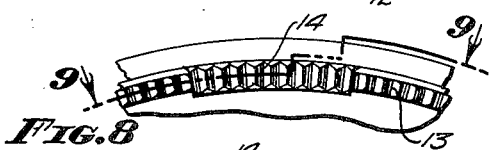
Fig. 8 is a fragmentary edge view of a further modified brake shoe and brake lining unit wherein interlocking serrations are provided.
Figure 9:
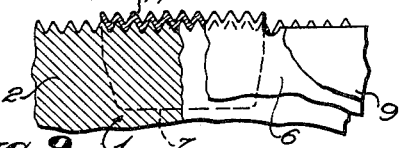
Fig. 9 is a fragmentary partial sectional, partial plan view taken substantially along 9—9 of Fig. 8.

Still further, as shown in Figs. 8 and 9, the side margins of the arcuate plate 2 may be provided with serrations 13. These may be continuous or intermittent. In either case the tabs 7 and 8 are provided with mating serrations 14, so that when the tabs are folded over the margins of the brake shoe the serrations 13 and 14 intermesh to secure the brake lining against circumferential displacement.

While interlocking means, either in the form of recesses, shoulders, or serrations, are shown on both arcuate margins of the brake shoe, it will be observed that these elements may be positioned along one arcuate margin only.

Having fully described my invention, it is to be understood that I do not wish to be limited to the details herein set forth, but my invention is of the full scope of the appended claims.

I claim:

1. An interlocking demountable brake construction, comprising: an arcuate brake shoe having a plurality of interlocking elements along at least one arcuate margin the circumferential spacing between said elements being less than the width of said brake shoe; an arcuate brake lining backing plate having a plurality of identical bendable tabs along both arcuate margins, said tabs likewise being spaced a distance less than the width of said backing plate, said tabs adapted to be folded over the arcuate margins of said brake shoe; all of said tabs along at least one margin of said brake shoe adapted to interlock with the interlocking elements of said brake shoe and restrain said backing plate against relative circumferential displacement; all of the tabs along one arcuate margin of said backing plate being preformed into hook elements for engagement with said brake shoe by relative axial movement and all of said tabs along the opposite margin of said backing plate being preformed to occupy an obtuse angle relative to said backing plate; and a brake lining secured to said backing plate solely by a cementitious bond.

2. An interlocking demountable brake construction as set forth in claim 1, wherein: said interlocking elements are recesses in said brake shoe corresponding in width to said tabs.

3. An interlocking demountable brake construction as set forth in claim 1, wherein: said interlocking elements are shoulders formed at the radially inner side of said brake shoe, spaced to receive said tabs when folded thereunder.

4. An interlocking demountable brake construction as set forth in claim 1, wherein: said interlocking elements are a series of serrations along the margin of said brake shoe, and the tabs interlocking therewith are provided with corresponding serrations.

5. An interlocking demountable brake construction, comprising: an arcuate brake shoe having a plurality of interlocking elements along both arcuate margins; a preformed arcuate brake lining backing plate having a plurality of tabs along both arcuate margins, the tabs along one margin of said backing plate being preformed into hook elements adapted to hook under one margin of the brake shoe and interlock with said interlocking elements against circumferential displacement on said brake shoe, the tabs along the other margin of said backing plate being preformed to extend obtusely relative to the backing plate and defining therewith fold lines coinciding with the other margin of said brake shoe, to facilitate bending of said tabs into engagement with said interlocking elements along said margin to restrain said backing plate against circumferential displacement; and a brake lining secured to said backing plate solely by a cementitious bond.

References Cited in the file of this patent

UNITED STATES PATENTS

| | | |
|---|---|---|
| 1,488,717 | Sweet | Apr. 1, 1924 |
| 1,624,035 | Bowman | Apr. 12, 1927 |
| 2,590,749 | Buccino et al. | Mar. 25, 1952 |
| 2,631,697 | Bonkowski | Mar. 17, 1953 |

FOREIGN PATENTS

| | | |
|---|---|---|
| 608,876 | France | Apr. 30, 1926 |